May 2, 1933.       B. S. FLORADAY         1,907,148
LIGHT CONSTRUCTION
Filed May 19, 1930

INVENTOR
Burton S. Floraday
BY Whittemore, Hulbert
Whittemore & Belknap
ATTORNEYS Patented May 2, 1933

1,907,148

UNITED STATES PATENT OFFICE

BURTON S. FLORADAY, OF TOLEDO, OHIO, ASSIGNOR TO THE DURA COMPANY, OF TOLEDO, OHIO, A CORPORATION OF OHIO

LIGHT CONSTRUCTION

Application filed May 19, 1930. Serial No. 453,778.

The invention relates to light constructions and is particularly applicable to lights, such as dome lights, rear lights, corner lights and the like, for use within motor vehicles. One of the objects of the invention is to so form a light construction that the light rays pass substantially uniformly through all exposed portions of the glass. Other objects are to so form the light construction that it may be manufactured at low cost; that the glass may be readily attached to the base; that different sizes and shapes of glass may be secured to the base; and that the base forms a socket for directly receiving the light bulb.

These and further objects of the invention will appear from the following description taken in connection with the accompanying drawing, in which Figure 1 is a plan view of a light construction showing an embodiment of my invention;

Figure 2 is a cross section on the line 2—2 of Figure 1;

Figures 3 and 4 are cross sections, respectively, on the lines 3—3 and 4—4 of Figure 2;

Figure 1:
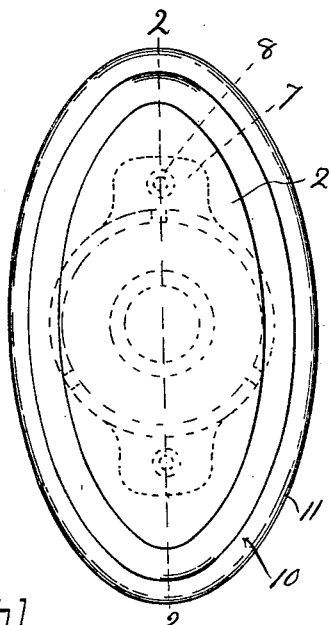
Figure 2:
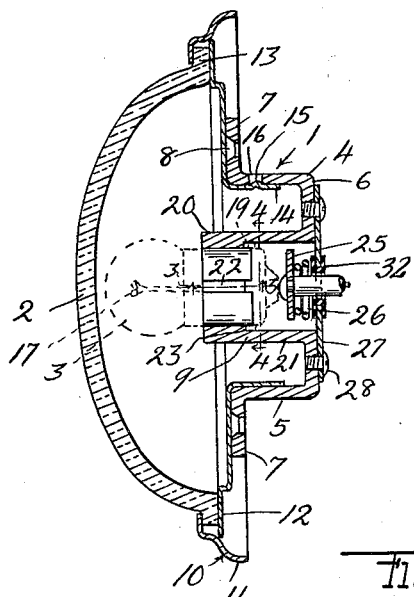
Figures 3, 4:
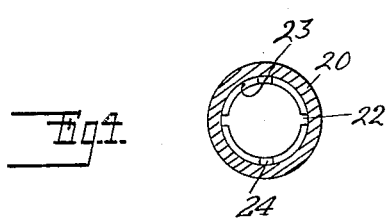

In general, the light construction embodying my invention comprises the base 1, the glass 2, which is mounted upon the base, and the light bulb 3. The base has the cup-shaped portion 4 with the cylindrical wall 5 and the rear or bottom wall 6. This base also has the diametrically opposite flanges 7 extending transversely from the front end of the wall 5 and integral therewith and apertured at 8 to receive suitable means, such as screws, for securing the base to its support. The base further has the centrally located hollow boss 9, which extends forwardly from the rear wall 6 and is integral therewith.

For the purpose of securing the glass 2 to the base 1, I have provided the rim 10 which carries the glass and is detachably secured to the base. This rim has the ring 11 and the plate 12, which are permanently secured to each other and embrace the peripheral flange 13 of the glass. The plate extends along the front side of the securing flanges 7 and has the rearwardly turned cylindrical flange 14, which extends within the cylindrical wall 5 and is provided with the bosses 15 for engaging the transverse openings 16 formed in the wall 5. The parts of the rim are formed of sheet metal and the rearwardly turned flange 14 and also the bosses 15 are resilient so that the bosses have a snap engagement with the wall 5 of the base.

For the purpose of preventing the casting of any shadow upon the exposed portion of the glass 2, such as might be cast by the base of the bulb cutting off a portion of the light rays and in order that the light rays may pass substantially uniformly through all exposed portions of the glass, the hollow boss 9 of the base is extended so that its front end terminates forwardly of the securing flanges 7 and the light bulb 3, which is mounted in this boss, has its filament 17 located forwardly preferably a distance beyond the front face of the rim 10, so that the light rays from this filament may pass directly through all exposed portions of the glass without interference by either the boss 9 or the base of the light bulb 3. The bulb is of standard construction and to provide for its location the glass must be curved forwardly sufficiently to clear the front end of the bulb.

The hollow boss 9 is formed to directly receive the base 18 of the bulb 3, which base has the diametrically opposite projections or pins 19. Specifically, the front end portion 20 of the boss is of less internal diameter than the rear end portion 21 and this front end portion is provided with the diametrically opposite longitudinally extending grooves 22 for the passage of the projections or pins 19 during the assembly or disassembly of the bulb with the base. 23 is a rearwardly facing internal shoulder formed between these front and rear end portions and provided with the diametrically opposite rearwardly facing notches 24, which are arranged at right angles to the grooves 22, these notches being engageable by the projections or pins 19 after they have been passed through the grooves and the bulb has been rotated.

For the purpose of holding the bulb in its operative position with its projections or pins in the rearwardly facing notches, there is the metallic abutment member 25 which is engageable with the rear end of the base of the bulb and which is resiliently held in contact therewith by means of the coil spring 26, which latter abuts an insulating member 32 carried by the plate 27 secured to the rear face of the rear wall 6 by suitable securing means, such as the screws 28. The abutment member may form one of the electric terminals and one of the screws 28 the other.

The base, including the cup-shaped portion, the securing portions and the hollow boss, with the latter formed with the longitudinally extending grooves and the rearwardly facing notched shoulder, is formed by die-casting, so that this base may be manufactured at relatively low cost. The rim construction for securing the glass to the base is also simple and may be readily manufactured and provides for ready connection of the glass to the base.

Figure 5:
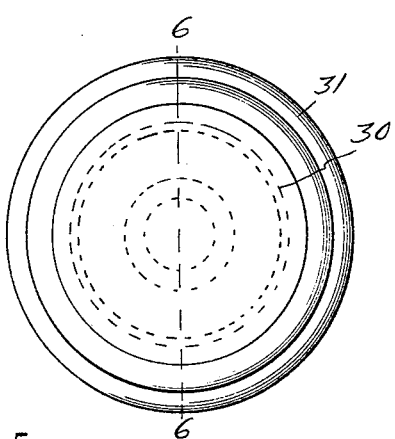
Figure 5 is a plan view of a modification.
Figure 6:
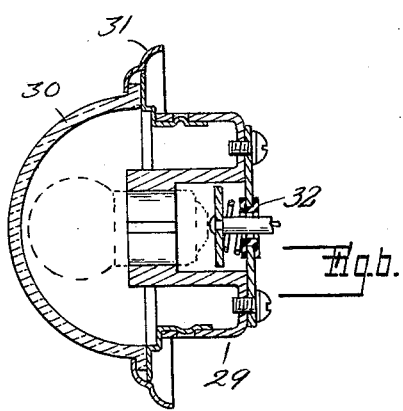
Figure 6 is a cross section on the line 6—6 of Figure 5.

The base is also so constructed that different sizes and shapes of glasses may be secured thereto and, in the embodiment shown in Figures 5 and 6, the construction of the base 29 and its associated parts is the same as that of the base 1 and its associated parts. The glass 30, however, has a circular flanged periphery, which is secured to and carried by the correspondingly shaped rim 31, this rim being attachable to the base 29 in the same manner as the rim 10 to the base 1.

From the above description it will be seen that the light rays may pass substantially uniformly through all exposed portions of the glass, the construction being such that no shadow, such as might be produced by some part of the light construction, such as the bulb base, will be cast upon the glass. It will also be seen that the light construction may be cheaply manufactured and that different sizes and shapes of glasses may be secured to the same base.

What I claim as my invention is:

1. In a light construction, the combination of a base having a cup-shaped portion, a socket integral with said base extending within said cup-shaped portion, a glass, a rim having a portion to which said glass is secured, and a portion extending within and secured to said cup-shaped portion, and a light bulb between said base and glass having its filament arranged beyond said base and its base mounted directly in said socket.

2. In a light construction, the combination of a base having a cup-shaped portion, a securing flange integral with said cup-shaped portion, a socket integral with said cup-shaped portion and extending therewithin, a glass, a rim having a portion to which said glass is secured, and a portion extending within and secured to said cup-shaped portion, and a light bulb between said base and glass having its filament arranged forwardly beyond said base and its base mounted directly in said socket.

In testimony whereof I affix my signature.

BURTON S. FLORADAY.